United States Patent [19]

Drake, Jr.

[11] 4,274,647
[45] Jun. 23, 1981

[54] MANUALLY STEERABLE SKATEBOARD

[76] Inventor: Louis V. Drake, Jr., 1138 Fourth Ave., Los Angeles, Calif. 90019

[21] Appl. No.: 19,157

[22] Filed: Mar. 9, 1979

[51] Int. Cl.³ .............................................. A63C 17/14
[52] U.S. Cl. ...................... 280/87.04 A; 280/47.37 R; 280/261; 280/279; 180/181
[58] Field of Search ................ 280/87.04 R, 87.04 A, 280/87.01, 87.02 R, 259, 261, 263, 267, 270, 274, 279, 43.37 R, 410; 180/181

[56] References Cited

U.S. PATENT DOCUMENTS

| 1,253,768 | 1/1918 | Aman | 280/87.04 R |
|---|---|---|---|
| 1,269,107 | 6/1918 | Moomaw | 280/87.04 R |
| 1,951,277 | 3/1934 | Elliotte | 280/87.04 R |
| 2,051,762 | 8/1936 | Vincent | 280/87.04 R |
| 2,134,318 | 10/1938 | Ruzich | 280/87.04 R |
| 3,096,100 | 7/1963 | Clarke et al. | 280/261 |
| 3,100,651 | 8/1963 | Reese | 280/47.37 R X |
| 3,513,926 | 5/1970 | Paget, Jr. | 280/279 X |
| 3,620,547 | 11/1971 | Vaverek | 280/87.04 A |
| 4,094,372 | 6/1978 | Notter | 180/181 |
| 4,145,065 | 3/1979 | Kupka | 280/87.04 R |
| 4,179,134 | 12/1979 | Atkinson | 280/87.04 A |

Primary Examiner—David M. Mitchell
Attorney, Agent, or Firm—Fulwider, Patton, Rieber, Lee & Utecht

[57] ABSTRACT

A manually steerable skateboard is provided in which the skateboard has two horizontal, wheeled frame members joined at an articulated joint. A rider standing on a rear frame member can turn a front frame member using a steering assembly connected to grippable handle bars. Embodiments of the steerable skateboard having one or more seats for the rider's use and embodiments in which locomotion is provided by operator driven foot pedals, by electric motors, and by internal combustion engines are disclosed.

6 Claims, 8 Drawing Figures

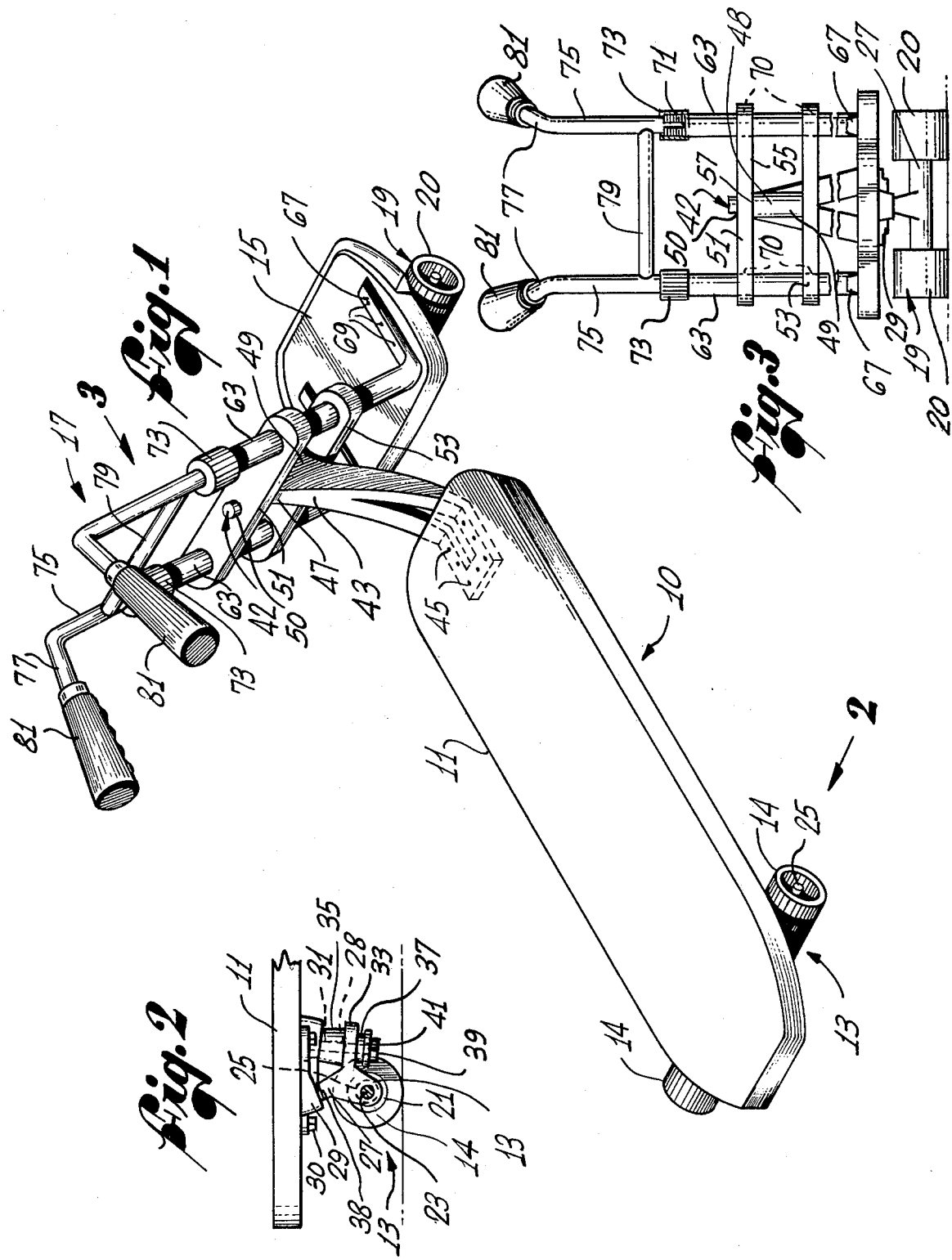

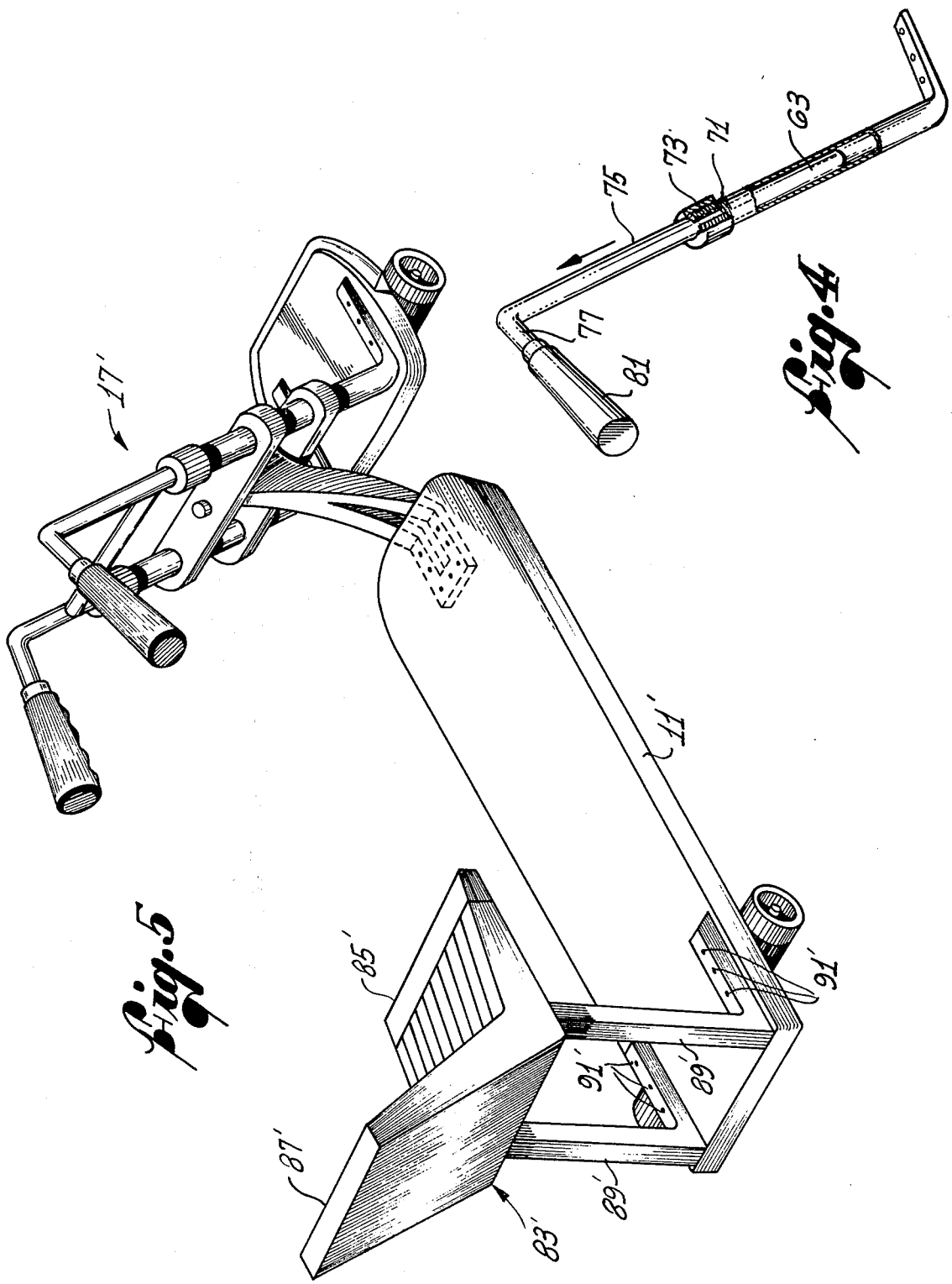

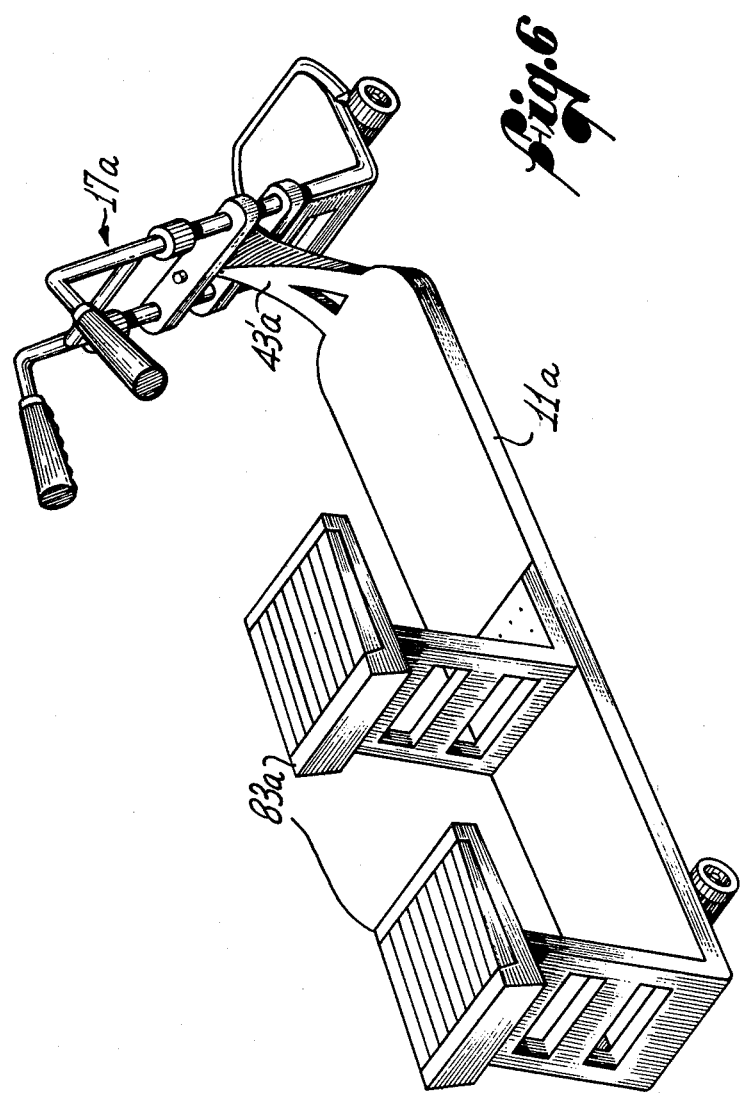

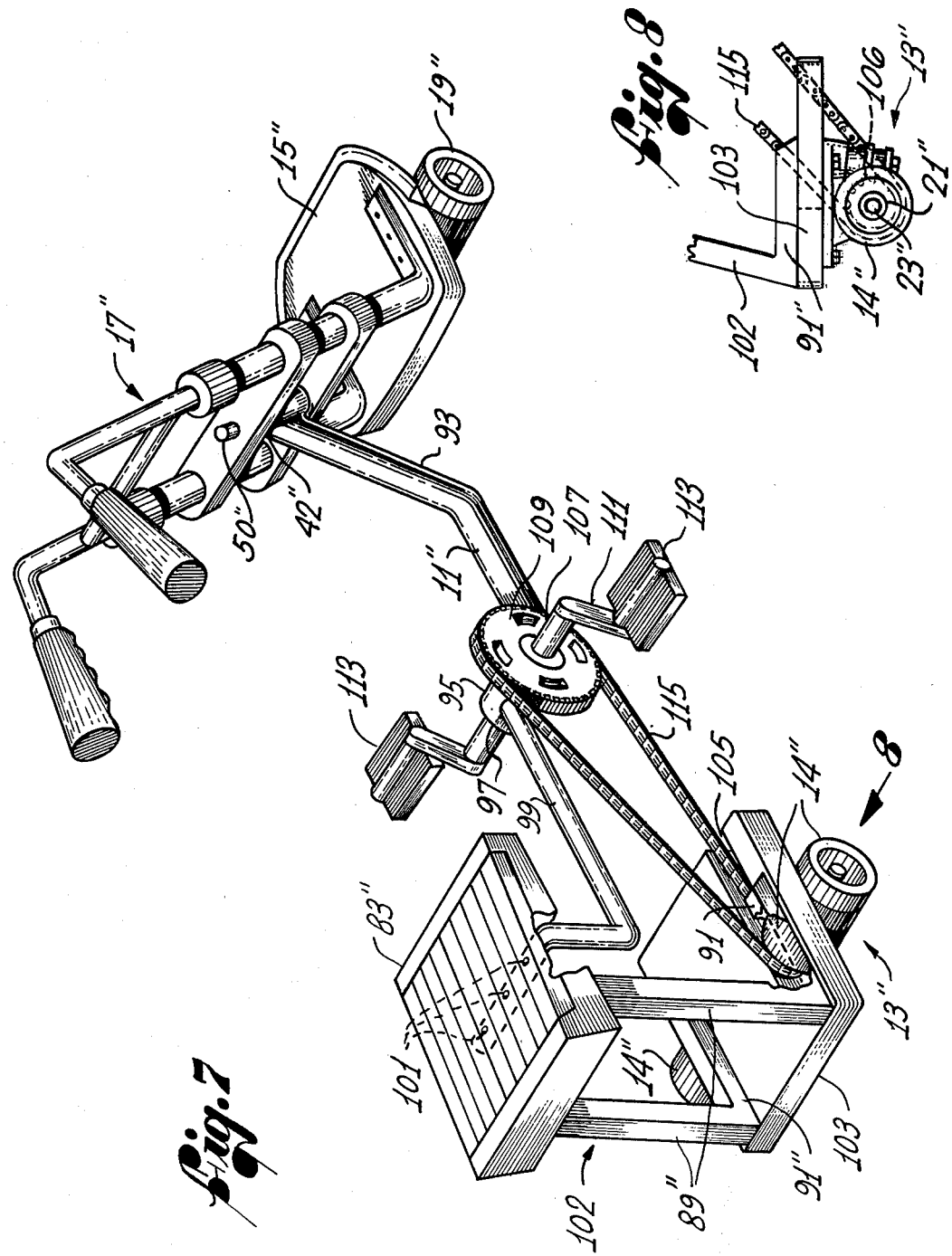

MANUALLY STEERABLE SKATEBOARD

BACKGROUND OF THE INVENTION

The invention relates to skateboards used for recreational and personal transportation and which are powered by the rider's feet.

Prior to this invention, the steering of skateboards was controlled by the rider shifting his weight from side to side. As the rider shifted his weight to one side the geometry of the wheel trucks, the skateboard's suspension system, is altered causing the axles and wheels of the trucks to change their orientation. While various methods of controlling a skateboard's wheel trucks, and hence the path followed by the skateboard, have been devised and are commercially available, all such systems rely upon the shifting of the rider's weight, and the attendant relocation of the force acting on the truck's wheels to turn the skateboard.

Skateboards using traditional steering methods suffer from several serious shortcomings. The technique employed by the rider for turning the skateboard is an unnatural one and one not easily acquired by novices. Hence, new riders frequently suffer falls while attempting to negotiate turns. Moreover great numbers of potential skateboard riders are dissuaded from using skateboards because of the difficulty they envision they will experience in learning to negotiate turns on a skateboard.

Another problem encountered relates to the methods which riders must use to increase the amount of a turn. Riders increase the rate of turn by increasing the amount of weight they place on the outside wheels through concerted leaning into a turn. Unfortunately, such leaning can cause the rider's center of gravity to move outside the center of force acting on the wheels and result in the upsetting of the skateboard.

Still another disadvantage of presently available skateboards is their lack of any accommodation for the rider other than a platform on which the rider must stand. When the skateboard is used as a means of personal transportation, it is highly desirable that a seat be provided so that the rider need not remain on his feet for the entire journey.

A final shortcoming of the present skateboards is that there is no means for locomotion other than pushing with one's foot. While foot propulsion is simple and convenient, it lacks any method for providing a mechanical advantage to the rider or operator. Moreover, as the rider pushes the board with one foot, his center of gravity is constantly changing. Skateboard riders of all levels of experience have allowed their center of gravity to move, while they are propelling the board, outside of the boundary of stability with the result that the board upsets.

SUMMARY OF THE INVENTION

The present invention resides in an improved skateboard capable of being manually steered. The skateboard includes a frame, similar in construction and composition to that used in presently available skateboards below which frame are located rear wheels, a front platform below which are located front wheels and an articulated joint between the frame and the front platform. When the front platform is articulated, as the skateboard is moving, the platform and the skateboard follow the path described by the front wheels. Articulation of the board is controlled by a manually operated steering assembly connected to a pair of handlebars.

In a preferred embodiment of the invention, the articulation assembly comprises structures rising from both the frame and the front platform and a post and tube assembly which pivotably joins the two structures. The structure rising from the frame is an elongated articulation support whose forward end terminates in a generally vertical butt end in which is located the tube capable of receiving the post. The structure rising from the front platform comprises braces disposed slightly off the vertical, which transmit the load to the front platform, cross supports which both join and rigidly align the braces and which connect the braces to the post which passes through a hole in the cross supports.

To provide for manual steering of the skateboard, vertically adjustable steering handles extend upwardly from the tops of the braces. The skateboard rider adjusts the height of steering handles exposed above the braces to a position where the handlebars are a comfortable height for his hands. The rider can grasp the handlebars and can then control the articulation of the front wheels by turning the handlebars and the front platform in the same manner in which a bicycle rider turns the front wheel of a bicycle.

An important feature of this embodiment is that the rider can quickly and accurately control the path of the wheels of the skateboard and, hence, control the path the skateboard will describe. The present invention also provides a skateboard in which the front wheels are capable of being turned through a far greater number of degrees than can be the wheels in trucks presently installed in skateboards which a rider controls by shifting weight. This improved turning ability allows the inexperienced rider to make sharp turns at, for example, intersections.

Other embodiments of the present invention utilize the steerably articulated front platform feature, and add to the skateboard other auxiliary features. One embodiment provides a seat located at the rear of the skateboard frame on which the rider may sit while using the skateboard. Another embodiment provides two seats, arranged in tandem, for use by two riders on the skateboard.

A third embodiment of the skateboard provides a foot operated pedal drive located beneath the rider's feet by which power can be supplied to the rear wheels. In this third embodiment, the frame and articulation support of the first embodiment are replaced by a tubular framework running from the point of articulation to the rear seat. Lying midway along this frame and between the front and rear main frame is a sprocket and driveshaft, the cranks of which are driven by foot pedals. If desired, the driveshaft can be driven by an internal combustion or electric motor. A chain transmits the power from the driveshaft sprocket to the wheels of the rear truck which couple the locomotion power to the ground.

The pedal driven embodiment of the skateboard is particularly well suited for persons lacking a fine sense of balance. The widely spaced wheels provide protection against the device tipping over sideways. Further, the location of the pedal drive near the center of the skateboard allows the operator to keep his weight more nearly centered as he propels the board than can one who propels a standard skateboard by foot.

BRIEF DESCRIPTION OF DRAWINGS

A manually steerable skateboard constructed in accordance with the invention is illustrated in the accompanying drawings in which:

FIG. 1 is a perspective view of the skateboard, showing the board and a steering assembly;

FIG. 2 is a fragmentary side elevational view of the skateboard taken in the direction of the arrow 2 of FIG. 1;

FIG. 3 is a reduced size front elevational view of the steering assembly taken generally in the direction of the arrow 3 of FIG. 1;

FIG. 4 is a fragmentary perspective view of a steering brace partially broken away to show the location of a steering handle;

FIG. 5 is a perspective view of a skateboard having a seat;

FIG. 6 is a perspective view of a skateboard having two seats;

FIG. 7 is a perspective view of a skateboard powered by a pedal drive; and

FIG. 8 is a fragmentary side elevational view of a rear truck of the pedal drive skateboard taken in the direction of the arrow 8 in FIG. 7.

DETAILED DESCRIPTION

As shown in the drawings for purposes of illustration, the invention is embodied in a skateboard, indicated generally by reference numeral 10 in FIG. 1, which is used for recreational transportation over hard manmade surfaces. The skateboard is well suited for use on sidewalks, driveways, streets, in specially built recreational parks or anywhere where the surface is hard, generally uniform and is free from discontinuities.

In general, the skateboard 10 is supported on wheel trucks 13 and 19 on the bottom side of the skateboard which trucks are capable of supporting the weight of the skateboard and rider. In accordance with the present invention, the body comprises two sections, a frame 11 and a front platform 15 which are articulated, and a steering assembly 17 attached to the front platform which enables a person riding on the frame 11 to controllably articulate the front platform with respect to the frame and thereby steer the skateboard by directing the front wheel truck 19.

More specifically, the frame 11 is a flat, generally rectangular solid body of uniform thickness which may be composed of wood, metal, or synthetic material. The frame is disposed horizontally such that a rider can stand upon it. The length of the frame 11 exceeds its width, and its thickness is sufficient to provide strength sufficient to support the weight of a rider. The front platform 15 is generally of the same width and thickness as the frame 11 and is composed of the same material, but it is shorter than the frame 11 and has a more nearly square shape.

Attached to the bottom of the frame 11 near the rear of the frame is a rear truck 13 containing two wheels 14, and attached to the bottom of the front platform 15 is a front truck 19 containing two wheels 20. The trucks and their wheels are standard skateboard appliances, which will be referred to in this specification as dirigible trucks, which are widely available in a variety of sizes, compositions and standards of quality. The rear truck 13 and front truck 19 are similar in their construction.

As shown in FIGS. 2 and 3 which illustrate a truck of the type used in the invention, each truck supports two solid wheels generally made of synthetic material. The wheels and their attached ball bearing 21 are held to an axle 23 by a nut 25 engaging threads on the axle 23. The axle is held in a given position by being disposed in an axle holder 27 capable of supporting the axle.

The truck 13 is located on the skateboard with a rectangularly shaped metal base 29 which is attached to the bottom of the skateboard by a screw 30. To support the axle below the base 29 a post 31 descends from the base at some inclination from the vertical. Near the end of the post 31, a junction plate 33, a flat circular portion of the axle holder 27 in which a hole 28 is cut, is slippably positioned over the post 31. In order to preserve the distance between the base and the location of the holder 27 a compressible spacer 35 is inserted over the post 31 between the base 29 and holder 27.

For the purpose of holding the axle holder 27 and junction plate 33 on the post, a screw 39 protected by a washer 41 is engaged into female threads at the top of the post 31. Between the screw 39 and junction plate 33 lies a bushing 37 which merely acts as a buffer. The method of mounting the axle holder 27 on the post 31 described here allows the axle holder 27 to pivot about the post 31 although the rotation is limited by a stop 38.

The screw 39 not only acts to hold the junction plate 33, spacer 35 and bushing 37 on the post 31, but it also can control the manner in which the axle holder 27 can pivot. As the screw 39 is adjusted inwardly toward the base 29, the spacer 35 is compressed. When the spacer 35 is compressed, the amount which the junction plate 33 can rotate about the post 31 is restricted.

The design of the standard skateboard trucks allows the wheels 14 and 20 and the axles 23 to turn to one side as the rider shifts his weight and increases the load on an outside edge of the wheels. The amount which the wheels turn in response to a given shift in weight and load can be controlled by the adjustment of the screw 39 described above.

As is shown in FIGS. 1 and 3 for purposes of illustration, the skateboard in the present invention provides a means for manual control of the direction of the skateboard which can supplement or replace the steering control found in a standard skateboard. The board is articulated at a joint 42 located between the frame 11 and the front platform 15. An articulation support 43 made of metal or other material of similar strength, extends forwardly and upwardly from the front of the frame 11. A rearward end of the articulation support 43 is connected to a front portion of the frame 11 by screws 45 or other suitable fasteners or it can be molded or formed as unitary part of the frame. A forward end 47 of the articulation support has a generally rectangular butt end 48 whose vertical dimension exceeds its lateral dimension.

For the purpose of providing the articulated joint 42, there is located in the butt end a cylindrical tube 49 capable of receiving a post. The axis of the tube 49 is inclined from the vertical so that it slopes away from the frame 11 as it descends from the butt end 48. A post 50 capable of passing through the tube 49 and capable of joining the frame 11 and steering assembly 17 is located in the tube 49.

In order to provide a connection between the front platform 15 and the articulated joint 42, above and below the articulation support end 47, lie an upper cross member 51 and a lower cross member 53 which are structural parts of the steering assembly 17. These rectangular cross members, made of metal or other strong material, are disposed in a generally horizontal plane lying perpendicular to the axis of the tube 49, in the butt end 48. A snug fit is provided between the butt end 48 and the cross members 51 and 53 which eliminates play in the articulated joint 42. The lower side 55 of the upper cross member 51 lies flush with the upper face 57 of the butt end 48 of the support.

The post 50, which passes through the holes in the cross members 51 and 53 and the support 43, holds the three parts together and forms the axis about which the skateboard articulates. Bushings (not shown) between the articulation support 43 and cross members 51 and 53 are used to reduce friction between the articulation support, the cross members, and the post.

The cross members are connected to the front platform 15 by two steering braces 63. These braces are generally tubular structural members extending from a position above the upper cross member 51 to a position adjacent to the front platform 15 where the brace terminates in a generally flat or rectangular end 67 suitable for connection to the front platform by screws 69 or other fasteners. The braces 63 join the cross members 51 and 53 by passing through a cylindrical hole 70 in each end of the upper and lower cross members 51 and 53 which receives and holds the steering braces fast to the cross members. As shown in FIG. 4 for purposes of illustration, at the upper end of each steering brace 63 and 65 is located a ferrule 71 whose inside diameter is controlled by a knurled knob 73 located atop and overlying the ferrule 71. The ferrule and knob provide means of adjusting the height of the steering handles 75 which are engaged in the steering braces 63. The ferrule 71 has no bottom and hence the steering handle 75 can pass through the ferrule 71. The skateboard rider can turn the knob 73 to release the ferrule 71, slideably relocate the steering handles 75, and then turn the knob 73 to tighten the ferrule 71 and lock the steering handle 75 in place.

The steering handles are composed of metal, or other suitable material, and have a sufficiently long shaft length so that they may be adjusted in order that various amounts of the steering handles can lie exposed above the steering braces. A steering handle brace 79 lying normal to the axis of the steering handles, and generally parallel to the cross members connects the steering handles and holds them in rigid alignment. An extreme end 77 of the steering handle 75 is bent downwardly and rearwardly so that the end 77 is nearly parallel to the frame 11. The pair of ends form a set of handles for the rider to grasp. The extreme ends 77 of the handlebars are covered by cylindrical handlebar guards 81 made of rubber or other soft materials suitable for making manual grips.

In this embodiment of invention the rider of the skateboard stands on the frame 11 and grasps the handlebar guards 81. The rider provides locomotion by pushing with his feet. Steering control is provided by manually turning the handles 75. Because the skateboard uses standard dirigible skateboard trucks, additional steering control can be achieved by the rider's shifting his weight as the rider of a standard skateboard must do.

A second embodiment of the invention is illustrated in FIG. 5. The corresponding elements in these figures use the same numbers as in FIGS. 1-4 except that the numbers are shown primed in FIG. 5. In this embodiment, a seat 83' is provided for the use of the skateboard rider. The seat 83' has a generally horizontal base surface 85' and has a back surface 87' rising from the seat base 85' at an angle inclined from the vertical.

The seat is composed of any material which is sufficiently strong to support the weight of a sitting rider. The seat must have sufficient width for the rider's comfort, but requires no other particular dimension except that which is needed for structural strength.

A set of seat supports 89' rise from the frame 11' and hold the seat 83' disposed in a position above the frame comfortable for the rider. The seat supports 89' are generally rectangular members composed of a material sufficiently strong to support the force exerted on the seat when the vehicle is in use. The supports 89' are attached to the frame by screw fasteners 91' or other suitable means.

A third embodiment of a skateboard with a seat is illustrated in FIG. 6. The corresponding elements in this figure uses the same numbers as in FIGS. 1-4 and FIG. 5 except that the letter "a" has been added to corresponding reference numerals. The skateboard in this embodiment has two seats 83a, constructed in the same manner as the single seat described above, which are located in tandem on the frame 11a. The frame 11a in this embodiment must be slightly longer than the frame 11' in the single seated embodiment, in order to accommodate the second seat. Further, the articulation support 43a and the steering assembly 17a must be constructed in a manner sufficiently strong to hold the added weight of a second rider.

A fourth embodiment of the invention which is pedal driven is illustrated in FIGS. 7 and 8. The corresponding elements in these figures use the same numbers as in FIGS. 1-6 except that the numbers are double primed in FIGS. 7 and 8. In this embodiment, the skateboard rider can provide locomotive power to the skateboard by cranking foot operated pedals. The steering assembly 17", the front platform 15" and front truck 19" are similar, and can be identical, to those of the first embodiment. The rectangular frame 11 of the first embodiment is replaced by a tubular frame 11", composed of cylindrical or tubular structral members. The frame 11" is composed of metal or other material having sufficient strength to support the weight of a rider and which is easily worked.

The frame is comprised of three sections which support the skateboard and house the pedal apparatus. A front main frame 93 is connected at its forward end to the steering assembly 17" by the post 50" from which point it extends downwardly and rearwardly. The front main frame is a structure composed of metal tubing or other suitable materials joining on its forward end a cylindrical tube capable of receiving the post 50" passing through the steering assembly 17".

A rear end of the front main frame 93 terminates in a frame junction 95. The frame junction 95 is a cylindrical member with a transverse aperture in its center configured to receive a drive shaft. The frame junction 95 lies generally horizontally, and is disposed transverse to the skateboard's length. The frame junction 95 is composed of metal tubing or other suitable material.

Extending rearwardly from the frame junction is a rear main frame 99, which is another structural member composed of metal tubing or other suitable material. The rear main frame terminates in a configuration suitable for being connected by screws 101, or other fasteners, to the bottom side of the seat 83".

The rear assembly 102 of the embodiment, which includes the seat 83", the seat support 89" and a rear platform 103 is generally equivalent to the structure used in the first embodiment. The lower ends of the seat supports 91″ terminate adjacent to and are fixedly attached to a rear platform 103. The rear platform is generally square, having a thickness approximately equal to that of the frame 11 in the first embodiment.

In order to provide access through the rear platform for the chain or other drive means a generally reactangular longitudinal channel 105 is cut through the rear platform. The channel 105 is sufficiently wide and deep to both accommodate a sprocket 106 which is attached to the rear truck 13″ and to allow a chain 115, or other power transmitting means access to the sprocket 105.

A chain driving assembly is located adjacent to the frame junction 95. The driving assembly includes a cylindrical drive shaft 107, passing through the hole 97 in the frame junction 95, to which is fixedly attached a chain sprocket 109. A set of opposing connecting cranks 111, one located at each end of the shaft, terminate at pedals 113 which can be driven by the feet of the skateboard rider.

A continuous chain 115 passes over the sprocket 109, to the rear sprocket 106 and returns. The rear sprocket 106 is fixedly connected to a solid rear truck axle 23″ which itself is fixedly connected to the rear truck wheels 14″. Bearings 21″ are provided between the axle and the axle holder 27″.

It should be apparent that while the fourth embodiment of the skateboard, illustrated in FIGS. 7 and 8 is pedal driven, the locomotive power of the rider's feet could be replaced by that of an engine or a motor. Suitable means for powering the skateboard include internal combustion engines and electric motors having a battery or solar power energy source. Power from such engines or motors can be transmitted to the rear wheels, where it acts to power the skateboard by using a chain drive and sprockets or any convention power transmission equipment.

From the foregoing it will be seen that the skateboard in the forms shown herein for the purpose of illustration is a highly safe and comfortable device for recreational and personal transportation. Furthermore, the design is strong, simple to construct, and relatively inexpensive. It will be seen that, while several particular forms of the invention have been illustrated and described, various modifications can be made without departing from the spirit and scope of the invention.

I claim:

1. A manually steerable skateboard of the type having two pairs of wheels each pair mounted in a dirigible truck; said skateboard comprising:
    an elongated generally horizontal frame having on its forward end a generally horizontal butt end in which is located generally vertical aperture;
    a generally horizontally disposed front platform;
    a plurality of generally cylindrical steering braces connected to the front platform and rising from the front platform in a direction generally parallel to the aperture in the butt end of the frame;
    a plurality of cross members disposed normal to the steering braces and connecting said braces, the space between said members being sufficient to accommodate the butt end of the frame, each cross member having in its center an aperture of a diameter essentially that of the aperture in the frame butt end;
    a post capable of passing through the apertures in the butt end and the cross members whose length is sufficient to connect the butt end to the cross members;
    a plurality of generally cylindrical steering handles each rigidly connected to one steering brace and capable of being grasped by the skateboard rider and used to manually articulate the front platform with respect to said frame; and
    one of said dirigible trucks supporting said front platform and the other of said dirigible trucks supporting said frame, said trucks being arranged to steer said skateboard in response to rotation of said skateboard about a longitudinal axis thereof.

2. A generally elongated skateboard of the type having at least two sets of wheels, a structure connecting said sets of wheels, and a steering apparatus, wherein the steering apparatus comprises the combination of:
    a joint in the structure located between the sets of wheels, about which joint a forward portion of the structure is capable of articulated movement with respect to the rearward portion of the structure about a substantially vertical axis; and
    one of said sets of wheels being mounted in a dirigible truck and supporting said forward portion of the structure, and another of said sets of wheels being mounted in a dirigible truck and supporting said rearward portion of the structure, each of said trucks being arranged to steer said skateboard in response to rotation of said skateboard about a longitudinal axis thereof.

3. A skateboard as defined in claim 2 wherein the forward portion of the skateboard structure comprises:
    a steering assembly pivotably connected to the articulated joint, capable of moving the forward set of wheels in an arc about the joint; and
    at least one steering handle fixedly attached to the steering assembly at the handle's lower end, which handle's upper end terminates in a generally horizontal extension suitable for manually gripping by a rider.

4. The skateboard as set forth in claim 2 further including at least one seat mounted on said rearward portion of the structure at a height suitable for use by a rider of said skateboard.

5. The skateboard as set forth in claim 2 further including means for providing driving power to said truck supporting said rearward portion of the structure.

6. The skateboard as set forth in claim 3 further including means for adjusting the height of said steering handle to accommodate a rider of said skateboard.

* * * * *